Sept. 29, 1964   W. M. LAFFERTY   3,150,876
SEALING STRUCTURE FOR PIPE JOINTS
Filed Nov. 14, 1961
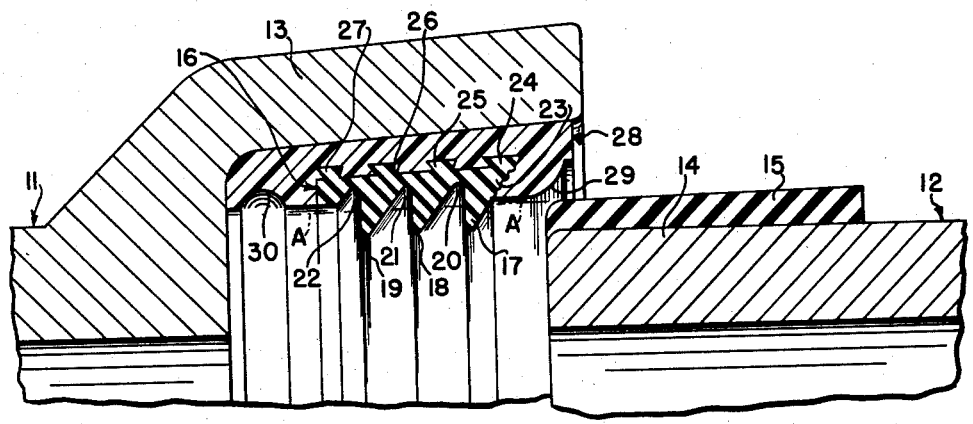
FIG. 1
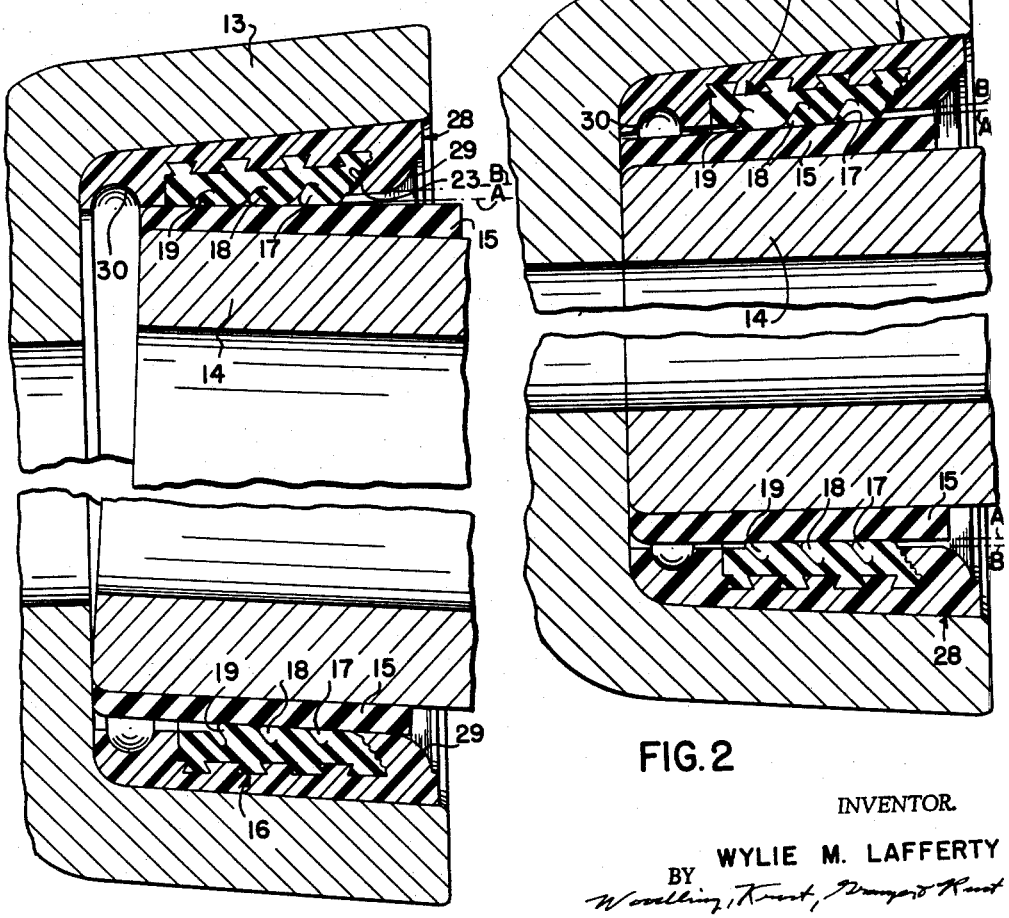
FIG. 2
FIG. 3
INVENTOR.
WYLIE M. LAFFERTY
BY
ATTORNEYS

# United States Patent Office 3,150,876
Patented Sept. 29, 1964

3,150,876
SEALING STRUCTURE FOR PIPE JOINTS
Wylie M. Lafferty, 310 Church St. SW.,
New Philadelphia, Ohio
Filed Nov. 14, 1961, Ser. No. 152,357
5 Claims. (Cl. 277—198)

My invention relates to pipe joints, such as used for sealingly joining the spigot of one pipe to the bell of another pipe.

An object of my invention is to provide an improved joint having a structure arranged for maintaining a seal between the spigot in a bell and the bell in which the spigot is inserted.

Another object is the provision of an improved sealing joint constructed to adapt itself to various conditions of use.

Another object is the provision for providing a gasket so constructed and mounted as to adapt itself to lateral force of one pipe relative to the other pipe, such as exerted by downward force on the spigot relative to the bell of an adjoining pipe in which inserted.

Another object is the provision in a pipe joint for obtaining improved results in a novel and ingenious manner.

Another object is the provision of a pipe joint constructed to provide for ready and easy insertion of a spigot into a bell and at the same time to provide a good sealing coupling therebetween.

Another object is the provision for constructing a pipe joint so as to accommodate sand or other debris which might be located between the spigot and bell in such a way as to diminish the obstruction of such sand or debris to the mounting of the spigot in the bell.

Another object is to provide an economically made joint providing a maximum of efficiency in sealing and coupling of a spigot of one pipe in the bell of an adjoining pipe.

Other objects and a fuller understanding of the invention may be had by referring to the following description and claims, taken in conjunction with the accompanying drawings, in which:

FIGURE 1 is a partial longitudinal sectional view showing the construction of my improved joint and the arrangement of the parts prior to the entry of the spigot into the ball;

FIGURE 2 is a partial longitudinal sectional view showing the spigot in the bell of an adjoining pipe and the disposition of the parts of the joint when the spigot and bell are in axial alignment and with no lateral displacement of one pipe relative to the other pipe; and FIGURE 3 is a view like that of FIGURE 2 but in which the spigot of the right-hand pipe has been tilted relative to the bell of the left-hand pipe so as to cause an imbalance or lack of uniformity of the distortion of the gasket.

The pipes to which my invention is applied are usually ceramic pipes of clay, cement or other material, but may be metal pipes as well. The invention is directed to the sealing joint provided for coupling the spigot of one pipe within the bell of an adjoining aligned pipe. In the drawing, one pipe is denoted generally by the reference character 11 and the adjoining aligned pipe is denoted generally by the reference character 12. The pipe 11 has an enlarged end or bell 13 which is the female element of the joined pipes. The pipe 12 has a spigot 14 at one end, which spigot 14 is the male element of the joined pipes. Pipes 11 and 12 have bores extending therethrough which provide communication through the aligned pipes.

Normally the pipes 11 and 12 are disposed in true axial alignment but there may be some lateral displacement of the axis of one relative to the other upon one pipe bearing more of a load than the adjoining pipe. This lateral displacement of the axis of one pipe relative to the axis of the other makes it difficult to maintain a good seal between the spigot and bell under all conditions of use. I prefer to mount on the spigot 14 a collar 15. Preferably the collar 15 is a polyester resin but may be of other suitable material which is firmly bonded or adhered to the spigot proper. The spigot 14 with the annular collar 15 bonded thereto may be referred to as the collared spigot or sometimes generally referred to as the spigot, as the collar 15 becomes a part of the spigot for purposes of this coupling. I preferably make the collar 15 relatively hard, as for example, of a hardness of 80–95 durometer measurement.

An annular gasket denoted generally by the reference character 16 is formed of a suitable elastometric material, as for example, rubber, synthetic rubber, or other rubber-like material having resiliently yieldable characteristics. Preferably, the material of the gasket 16 is relatively soft and has a hardness of 45–55 durometer measurement.

The gasket 16 has a plurality of inwardly projecting ribs. In the preferred form of my invention, there are three annular ribs 17, 18 and 19 extending radially inward of the gasket. It is noted that each rib has an inclined side disposed on the order of 40° to 50° to the axis of the gasket, and has an abrupt side disposed on the order of 85° to 95° to the axis of the gasket. Inclined sides of the ribs extend away from the entrance to the bell as illustrated.

Adjacent each rib is an annular groove on the side of the rib away from the entrance of the bell. At the side of the rib 17 is the annular groove 20, at the side of the rib 18 is the annular groove 21, and at the side of the rib 19 is the annular groove 22. These grooves have sides which correspond with the abrupt side of the preceding adjacent rib, as for example, groove 20 has a side which coincides with the abrupt side of the rib 17. The groove 20 also has an inclined side which corresponds with the inclined side of rib 18, the other grooves corresponding sides coinciding with the sides of the adjacent ribs.

At the forward end of the gasket 16, that is, at its end closest to the entrance of the bell, there are a plurality of annular serrations 23, as illustrated. On the outer wall of the gasket 16 there are provided four annular tenons 24, 25, 26 and 27. These tenons are undercut as illustrated for providing a dovetail juncture with the surrounding material.

To position and secure the gasket 16 concentric with the pipe 11 radially inward from the inner wall of the bell 13, there is provided an anchoring element 28. This anchoring element 28 is a settable material which is initially plastic and then hardens in firm rigid position. I prefer to use a polyester resin as material for this anchoring element 28 but a cement, a sulphur-sand compound, or other appropriate settable material may be utilized. The material for the anchoring element 28 is poured into the annular space between the gasket 16 and the inner wall of the bell 13 so as to firmly hold the gasket 16 in concentric position. Because the walls of the bell sometimes lack true concentricity due to the manufacturing process of the pipe, the pouring of the anchoring element 28, while plastic, into position while the gasket 16 is firmly held in true concentric position assures that the gasket is concentric notwithstanding any lack of true concentricity of the bell 13. As seen in the drawing, the material of the anchoring element 28 fills in around the tenons 24, 25, 26 and 27 so as to provide a dovetail connection therebetween. The settable material of which the anchoring element 28 is made also fills in and interlocks with the annular serrations 23 on the forward end of the gasket 16. The anchoring element 28 is molded in place so as to have a curved entrance wall 29 extending therearound, the wall 29 sloping from near the entrance of the bell rearwardly toward the gasket 16. The curved entrance wall facilitates the insertion of the collared spigot into the bell.

Rearwardly of the gasket 16, that is, to the left in FIGURES 1, 2 and 3, the anchoring element 28 extends to the bottom of the bell so as to extend between the gasket 16 and the bottom wall of the bell. In the wall of the anchoring element 28 at a point rearwardly of the gasket 16, there is provided an annular recess 30. This recess 30 accommodates sand or other debris which might be within the bell 13 when the spigot is inserted. By having a recess 30 to accommodate such sand or other debris, the spigot may move freely to its coupled position shown in FIGURE 2 with a minimum of obstruction by such sand or other debris.

Prior to the insertion of the spigot into the bell, the ribs 17, 18 and 19 have the form illustrated in FIGURE 1. However, by reason of the resilient yieldability of the ribs, they flex rearwardly, that is, away from the entrance of the bell, upon the insertion of the collared spigot into the bell. The ribs upon being flexed rearwardly move into the respective adjacent grooves.

The outer cylindrical wall of the collar 15 provides a reference or datum cylindrical shape which has been shown in broken lines and denoted by the reference character A. While the outer wall of the collar 15 is slightly tapered, it is generally of cylindrical shape and for purposes of convenience will be referred to as having a cylindrical shape and the corresponding reference or datum shape A will be referred to as having a like cylindrical shape. The cross-sectional area of the ribs, 17, 18 and 19 radially inward from the reference or datum cylindrical shape A is substantially the same as the cross-sectional shape of the grooves 20, 21 and 22 radially outward of the reference or datum cylindrical shape A. By being so proportioned that the ribs inwardly of A take up the same space as the grooves outwardly of A, the ribs upon being flexed by the insertion of the collared spigot substantially fill the respective adjacent grooves. By this means, the ribs being flexed by the insertion of the collared spigot are firmly supported and confined by the walls of the grooves outwardly of the cylindrical reference shape A. As the rubber-like material of the ribs is relatively non-compressible, the gasket provides firm support for the collared spigot within the gasket. The position of the flexed ribs 17, 18 and 19 within the corresponding grooves 20, 21 and 22 after the collared spigot is inserted in the bell is shown in FIGURE 2. It is seen that the grooves are substantially filled by the ribs that have been forced over into the grooves by the inserted spigot. The outer wall of the collared spigot corresponds with the reference or datum shape A. In this position of FIGURE 2, the two pipes are in true axial alignment and there has been no lateral displacement of one pipe relative to the other.

It is to be noted that the inner cylindrical wall of the anchoring element 28 forwardly and rearwardly of the gasket 16, and also of the gasket 16 adjacent its rear end, is disposed in a substantially cylindrical form which has been denoted by the reference character B. While there is some small taper to this wall, which corresponds to the taper on the outer wall of the collar 15, it is sufficiently cylindrical that for purposes of convenience this shape of the inner wall of the anchoring element 28 may also be referred to as cylindrical.

As seen in FIGURE 2, when the pipes are in true axial alignment and there is no lateral displacement of one pipe relative to the other, there is an annular space between the reference or datum shape A and the cylindrical shape B of the inner wall of the anchoring element 28. For pipes eight inches and more in diameter, I prefer to have this space from A to B on the order of .062 inch. For pipes under eight inches in diameter, I prefer to have this space from A to B on the order of .046 inch. It will be noted that with the pipes in true alignment, as in FIGURE 2, the space between A and B is uniform around the spigot and the annular grooves 20, 21 and 22 are substantially filled by the flexed ribs 17, 18 and 19, respectively.

Upon lateral displacement of one pipe relative to the other, as for example, by a downward force on the spigot 14 greater than the downward force on the bell 13, the tendency of the spigot 14 is to be laterally displaced in the bell 13 so as to move downwardly toward the bottom wall of the bell 13. This downward force of the collared spigot relative to the bell 13 presses upon the ribs 17, 18 and 19 on the lower side of the bell, that is, toward the bottom in FIGURE 2. As the rubber-like material of the ribs 17, 18 and 19 are confined within their respective grooves 20, 21 and 22, this additional pressure tends to cause the material of the ribs to "flow" or move circumferentially up around the collared spigot toward the top of the spigot, that is, toward the upper side of the FIGURE 2. Under those conditions, there is not as much pressure on the ribs 17, 18 and 19 on the upper side of the collared spigot so that the ribs 17, 18 and 19 on the upper side may extend radially inward, that is, protrude downwardly, the amount to maintain sealing engagement with the collared spigot.

Because of the proportionate size of the ribs and grooves and the confinement of the flexed ribs in the grooves, the ribs accommodate themselves to this downward pressure on one side caused by unequal loading on the pipes and maintain a good sealing engagement entirely around the collared spigot. The cylindrical shape B at the bottom side of FIGURE 2 provides a limit to the downward movement of the collared spigot within the bell. As the outer wall of the collared spigot approaches the cylindrical shape B at the bottom portion of the bell in FIGURE 2, the space between A and B at the upper part of the bell in FIGURE 2 widens and the ribs there extend downwardly radially of the bell such a required amount as to maintain a good sealing contact with the collar 15 on the upper side of the spigot. By the structure and arrangement shown, there is assurance of a good seal in the joint notwithstanding lateral movement of one pipe relative to the other pipe under differences in load on the respective pipes.

In FIGURE 3, there is illustrated the advantage of the improved coupling under conditions in which the pipe having the spigot 14 is tilted relative to the pipe having the bell 13. In the illustration of FIGURE 3, the spigot 14 has been tilted so that its innermost end is slightly up and its other end is slightly down. As seen here, the ribs 17, 18 and 19 adapt themselves to these differences in pressures. At the lowermost part of FIGURE 3, the rib 17 is fully flexed within its corresponding groove 20 by reason of the tilting of the spigot. The collar 15 has been moved down at the location near the entrance of the bell 13 so as to engage the anchoring element 28 at the curved entrance wall 29. At the same time, the rib 19 inwardly of the bell and at the lowermost part of the bell has moved somewhat upwardly from the groove 22 so as to maintain sealing contact with the collar 15. The rib 18, being intermediate of the ribs 17 and 19, is raised only slightly at the lowermost portion of the bell—more than rib 17 but less than rib 19.

At the uppermost part of the bell in FIGURE 3, the disposition of the ribs is in reverse. There, the rib 17 is extended somewhat from its groove 20 so as to maintain engagement with the collar 15, whereas the rib 19 at the upper most part of the bell 13 is tightly compressed within its groove 22. The rib 18 is in a slightly extended position intermediate that of ribs 17 and 19. Because the ribs are confined in their respective grooves, they cannot "flow" under pressure other than circumferentially. For that reason, displacement of material of the rib 17 at the lowermost portion of the bell 13 provides that the rib 17 at the uppermost portion of the bell 13 extends radially inward to maintain sealing engagement with the collar 15.

It is to be noted that the annular space between the collar 15 and the anchoring element 28 at the lowermost portion of the bell, adjacent the entrance of the bell, in FIGURE 3 is at a minimum, whereas the space between the collar 15 and the anchoring element 28 at the uppermost portion of the bell, at the entrance of the bell, is at a maximum.

Again it is seen that by the improved coupling provided, there is accommodation not only to uniform displacement of one pipe relative to the other (that is, when there is no tilting of one pipe relative to the other) but there is also an accommodation to lateral displacement resulting from tilting of one pipe relative to the other.

It will be appreciated that by the novel proportioning of parts and their disposition in this new structure, there is a coupling provided between the spigot and bell of adjoining pipes which adapts itself to various load conditions and which assures a good seal between spigot and bell notwithstanding variations from true axial alignment of the coupled pipes.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. In a pipe joint between the bell of one pipe section and the collared spigot of an adjoining pipe section, an annular lining secured within the bell of said one pipe section for receiving the collared spigot of said adjoining pipe section, said lining comprising a gasket of elastomeric material having a plurality of annular resiliently yieldable ribs extending radially inwardly thereof to engage said collared spigot end, each of said ribs having a first side inclined away from the entrance to said bell at an angle on the order of about 40° to 50° to the axis of said pipe and an opposite second side disposed at an angle on the order of about 85° to 95° to said axis, and an anchoring ring of moldable settable material having a hardness and rigidity greater than that of said gasket surrounding and interlocked with said gasket and holding said gasket in said bell concentric with said axis and spaced from the wall of said bell, the outer surface of the collared spigot insertable in said gasket providing a reference substantially cylindrical shape concentric with said axis, the said gasket having a plurality of grooves each adjacent a said rib, a side of each said groove being substantially in the plane of a said first side of an adjacent rib, said ribs and grooves having cross-sectional areas on opposite radially directed sides of said reference cylindrical shape so proportioned that each rib substantially fills an adjacent groove on said first side of the rib upon said ribs being flexed away from the entrance of said bell by a said collared spigot inserted in said bell, the said flexed ribs in said grooves flowing circumferentially in the respective grooves from the side of the joint bearing the maximum radial load toward the side of the joint bearing minimum radial load, said anchoring ring having an outer end portion adjacent the entrance of said bell and an inner end portion adjacent the bottom of the bell, said outer end portion and inner end portion having inner bores substantially uniformly spaced from said reference cylindrical shape, the walls of said bores providing bearing surfaces engageable by said collared spigot upon tilting of the same relative to the axis of said bell.

2. A lining for the bell of a pipe adapted to receive the spigot of an adjoining pipe, said bell having a datum form extending axially thereof conforming to the shape of the spigot to be inserted in the bell, comprising an annular gasket of elastomeric material adapted to interengage with and receive a said spigot, an anchoring member surrounding and interlocked with said gasket and anchoring said gasket in concentric position spaced inwardly from the wall of said bell, said anchoring member being harder than said gasket and firmly supporting the same, said gasket having alternate annular ribs and grooves extending therearound, the radial cross-sectional area of said ribs and grooves on opposite radially disposed sides of said datum form being substantially equal, said ribs being resiliently yieldable and deformable to substantially extend to the bottom wall of the adjacent grooves, respectively, upon being pressed axially of said bell by a spigot inserted in said bell to fill said datum form, the deformed ribs substantially filling the respective ribs and upon being pressed radially inward at one circumferential location more than at an opposite circumferential location tending to move circumferentially toward an opposite circumferential location to maintain sealing engagement with the spigot at said opposite circumferential location, the inner cylindrical wall of said anchoring member forwardly and rearwardly of said gasket being disposed in a substantially cylindrical form generally corresponding to, and uniformly spaced radially outwardly from, said datum form forwardly and rearwardly of said gasket for providing similar limits to the tilting of the spigot in said bell at the opposite ends of said gasket.

3. In a pipe joint between the bell of one pipe and the spigot of another pipe, the combination of a collar on the spigot, a lining in the bell, a gasket of elastomeric material embedded in the lining and held concentrically in said bell, said gasket having a plurality of resiliently yieldable annular ribs concentric therewith and extending radially inwardly thereof, said ribs having inwardly inclined sides facing the entrance of the bell and abrupt sides opposite said inclined sides, said gasket having a plurality of annular grooves concentric therewith on the inner wall of the gasket each adjacent a said rib at the abrupt side thereof, said ribs and grooves, respectively, being so proportioned in cross-section that the grooves are substantially filled by the respective ribs upon axial positioning of a collar on said spigot in said bell upon insertion of the collared spigot into the bell to flex the ribs away from the bell entrance into adjacent grooves, said ribs being substantially confined in said grooves, respectively, said collar being radially spaced from said lining upon said collar being disposed concentric with said lining, radially directed movement of the bell and spigot relative to each other to diminish the space between the lining and collar at one location compressing said ribs to flow circumferentially in said grooves toward other locations to extend the ribs toward the collar at said other locations, the inner cylindrical wall of said lining forwardly and rearwardly of said gasket being spaced radially outwardly of said collared spigot a substantially uniform amount upon the collared spigot being disposed within the bell concentrically therewith, the inner cylindrical wall of said lining rearwardly of said gasket having an annular recess extending radially thereof intermediate of said gasket and the bottom wall of said bell to accommodate sand or other debris in the bell upon insertion of the spigot.

4. In a pipe joint structure in a pipe bell, the combination of resiliently yieldable means of elastomeric material extending radially inward of the bell and around the circumferential extent thereof to sealingly engage and be flexed by a spigot of an adjoining pipe inserted in said bell, groove means for receiving said resiliently yieldable means upon being flexed by a said spigot inserted in the bell, and anchoring means anchoring said resiliently yieldable means concentrically in said bell, said resiliently yieldable means and said groove means in relative cross-sectional areas being so proportioned that upon a said spigot being concentrically positioned in the bell the resiliently yieldable means substantially fills and is confined by said groove means and upon lateral displacement of one of said bell and spigot relative to the other the resiliently yieldable means flows circumferentially to maintain sealing engagement with said spigot, said anchoring means including a lining of settable material bonded to said bell and having a cylindrical bore for accommodating said spigot, the wall of said bore forwardly and rearwardly of said gasket being uniformly spaced from the spigot upon insertion of the spigot in the bell and forming stops means for limiting tilting of the spigot relative to the axis of the bell beyond said uniformly spaced wall.

5. A female joint element in a pipe bell in which a spigot of another pipe is inserted, comprising a lining in the bell, a rubber-like annular gasket anchored to the walls of the bell by said lining, said annular gasket having a plurality of resiliently yieldable annular ribs extending radially inwardly thereof and a plurality of annular grooves adjacent the ribs, respectively, for accommodating the ribs upon being flexed by a spigot inserted in the bell concentric with the axis thereof, said ribs and grooves being proportioned in size to provide that the ribs substantially fill and are confined by the grooves upon being flexed by the spigot in said consecutive position, said confined ribs flowing circumferentially to maintain sealing engagement with the spigot upon lateral displacement of the spigot relative to the bell, said lining forwardly and rearwardly of the gasket being uniformly radially spaced from the inner wall of the bell and positioned to stop angular tilting of the spigot beyond the substantially uniform limits provided by the lining at locations forwardly and rearwardly of the gasket, the lining at a location rearwardly of the gasket and at an axial distance therefrom being undercut to accommodate sand or debris in the bell in advance of the spigot.

References Cited in the file of this patent
UNITED STATES PATENTS

| | | |
|---|---|---|
| 2,451,070 | Chamberlain | Oct. 12, 1948 |
| 2,986,411 | Anderson | May 30, 1961 |
| 2,999,699 | Lafferty | Sept. 12, 1961 |